United States Patent [19]

McSwain

[11] Patent Number: 4,798,568
[45] Date of Patent: Jan. 17, 1989

[54] LINK BELT DRIVE

[76] Inventor: Joery McSwain, Rte. 4, Box 475, Albemarle, N.C. 28001

[21] Appl. No.: 76,778

[22] Filed: Jul. 23, 1987

[51] Int. Cl.$^4$ .............................................. F16G 1/24
[52] U.S. Cl. ...................................... 474/242; 474/245
[58] Field of Search ............... 474/201, 240, 242, 244, 474/245

[56] References Cited

U.S. PATENT DOCUMENTS 3,431,724  3/1969  Steuer ............................ 474/245 X

FOREIGN PATENT DOCUMENTS 583310  9/1959  Canada ................................ 474/245
910742  6/1946  France ................................ 474/245

Primary Examiner—Thuy M. Bui
Attorney, Agent, or Firm—McAulay, Fields, Fisher, Goldstein & Nissen

[57] ABSTRACT

A multiple link drive belt for use in a Reeves-type drive has each link molded as an integral nylon plastic unit. Sloping edges of each link frictionally engage sloping flanges on driving and driven shafts to transmit power. Side surfaces extending between the sloping edges have recesses therein. Hinged members in each of these recesses engage hinged members of adjacent links. The hinges are held together by a pin extending through a bore in each hinge. Each link rotates about the axis of the pin so as to enable the belt to curve around the driving and driven shafts. The hinged members of adjacent links are longitudinally spaced from one another to provide a first gap along the axis of the pin. The diameter of the bores is greater than the diameter of the pin to provide a second gap in a direction perpendicular to the axis of the pin. The outer surfaces of the hinged member of one length are spaced from the recessed surface of the adjacent link when the links are pinned together to provide a third gap in a direction perpendicular to the axis of the pin. These three gaps make it possible for the drive belt to accommodate misalignment between the set of driving flanges and the set of driven flanges.

22 Claims, 5 Drawing Sheets

FIG. I

LINK BELT DRIVE

BACKGROUND OF THE INVENTION

The present invention generally relates to a link member drive belt and more specifically relates to a drive belt to be used with a variable speed drive.

Drive belts for use with a variable speed drive are known in the art and examples of such belts are shown in U.S. Pat. Nos. 1,424,768; 2,177,410: 1,691,871; 1,940,297; 3,431,724 and 4,340,378.

Certain of these variable speed drives are known as Reeves drives.

The drive belt is used to transfer power from a driving shaft to a driven shaft. The two shafts are mounted with their axes in parallel. A pulley is mounted on each shaft. Each pulley has two radially extending spaced apart flanges. The pair of flanges on a shaft flare away from one another so that the surface of each flange has an angle to a plane perpendicular to the axis of the shaft. The belt extends between these pair of flanges. The links of the belt are thick and the edge surfaces of the links operate as the drive surfaces frictionally engaging the flanges. For proper operation, the pair of driving flanges have to be kept in alignment with the pair of driven flanges. This alignment assures that the drive belt will travel in a straight line and that the sloping edge surfaces of the links will engage the flange surfaces in a flush manner.

In use the axes of the two drive shafts tend to shift relative to one another in an axial direction. This causes one pair of flanges to get out of alignment with the other pair of flanges. The result is that the drive surfaces of the links on the drive belt improperly engage the flanges. The result is damage to the links of the drive belt and to the flanges. The drive belt wears and breaks. Grooves are worn into the flanges. To prevent belt breakage and excessive damage to the flanges, it is necessary to stop the operation at an uneconomic time in order to replace or repair the belt. The result is expensive down time. In addition, the drive belts are expensive items.

The distance between the flanges of one of the pulleys is adjusted to affect the drive ratio. One of the limitations of prior art drive belts is that a limit on the radius of curvature of the belt limits the drive ratio obtainable.

Prior art belts tend to overheat, causing a risk of fire. Prior art belts also absorb grease, thereby losing friction and increasing the risk of fire from overheating.

Accordingly, it is an object of the present invention to provide a link member drive belt which can adjust to flange misalignment.

Another object of the invention is to provide such a belt which is not easily broken and which wears well.

A further object of the invention is to provide such a belt with a low radius of curvature so that the belt can adjust to a wide range of drive ratios.

Yet another object of the invention is to provide a belt which is resistant to degradation in strength or frictional performance.

Still a further object of the invention is to provide such a belt which is relatively inexpensive to manufacture and maintain.

BRIEF DESCRIPTION

In one embodiment of the present invention, multiple separable links constitute the drive belt. Each link member has a main portion with first and second drive surfaces on opposite ends of the main portion. First and second longitudinal side surfaces extend between the end surfaces. Each of the side surfaces has a longitudinal recess surface.

On each recess surface there is at least one hinge member having a longitudinal bore. The hinge member of each link extends into the recess of an adjacent link. A pin extends through the bores of the hinge members of adjacent links to provide axial alignment of the hinge members of adjacent links. The axis of each bore is equidistant between the recess surfaces of adjacent links.

The axially aligned hinge members of adjacent links are spaced axially from one another on the pin to provide a first gap. The diameter of the bore is greater than the diameter of the pin to provide a second predetermined gap. The hinge members are spaced from the recess surfaces of adjacent links to provide a third predetermined gap.

When a belt is driven along an X-axis, the pins in the bores permit rotation of adjacent links relative to one another about a Y-axis.

The first, second and third predetermined gaps permit a limited rotation of adjacent links relative to one another about the Z-axis. This rotation about the Z-axis permits the drive belt to accommodate to flange misalignment.

DETAILED DESCRIPTION

Figure 1:
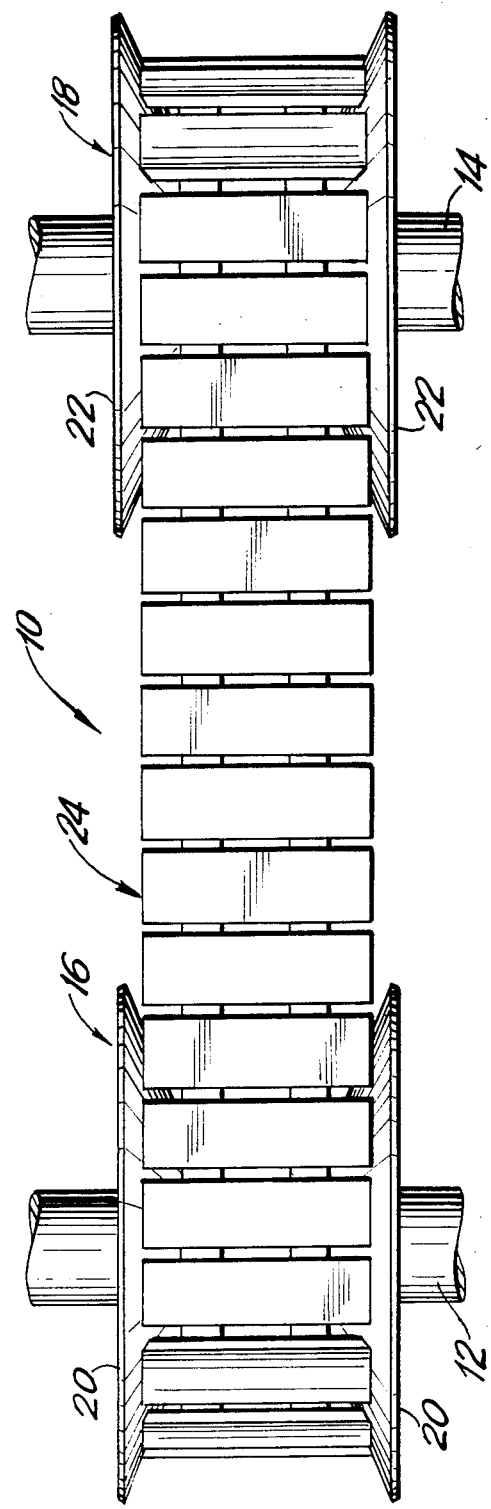
FIG. 1 is a mechanical schematic view of an embodiment of this invention showing the drive belt 10 connecting a driven shaft 14 to a drive shaft 12 through a Reeves type drive.
Figure 2:
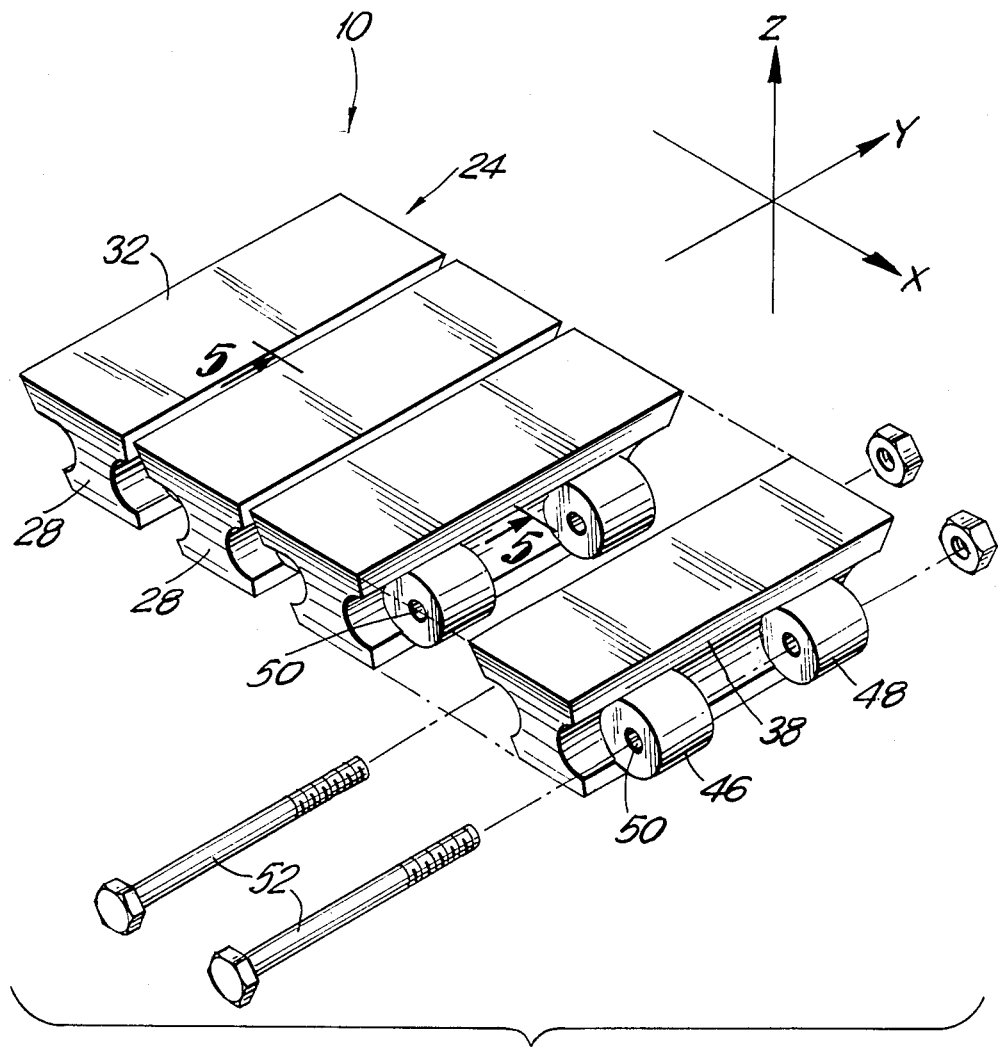
FIG. 2 illustrates four links 24 of the FIG. 1 device. One of the links and its bolt connections are shown in an exploded view. That link is shown in perspective, showing the longitudinal surface having two hinge members in the recess.
Figure 3:
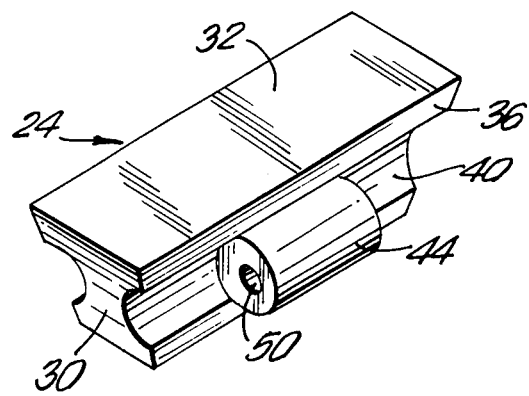
FIG. 3 is a perspective view of one of the links 24 showing the longitudinal side having a single hinge member in the recess.
Figure 4:
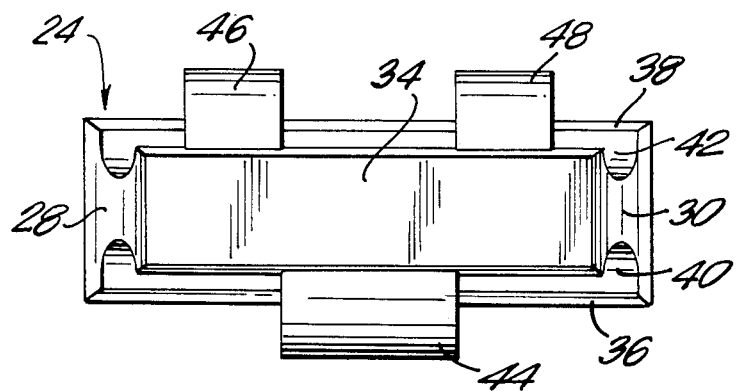
FIG. 4 is a bottom view of one of the links 24.

Referring to the drawings, the reference numeral 10 denotes the drive belt of the present invention. Drive belt 10 is intended for use with a variable speed drive of the type sometimes referred to as "Reeves."

In a Reeves drive, the driving force is delivered from a driving shaft 12 to a driven shaft 14 using drive belt 10. Belt 10 extends between pulleys 16 and 18. Each pulley 16, 18 has a pair of flanges 20, 22 respectively. The axial spacing between the flanges of a pair can be changed so as to vary the diameter of the pulley and thus vary the transmission drive ratio. As described to this point, except for the drive belt 10, the apparatus is conventional in the art.

Drive belt 10 has a plurality of interconnected links 24. Each link 24 has a main portion 26 and first and second drive surfaces 28, 30 on opposite ends of the main portion 26. Drive surfaces 28 and 30, functionally engage the flanges 20, 22 to deliver drive force from the drive shaft 12 to the driven shaft 14. The link drive surfaces 28, 30 have an upper edge wider than the lower edge. The surfaces 28, 30 are not parallel to one another. They are angled to properly engage the flaring flange 20, 22 surfaces. Each link 24 has an outer surface 32 and an inner surface 34. The outer surface 32 is longer and wider than the inner surface 34. Thus each link is trapezoidal in cross section in both the X-Z plane and in the Y-Z plane.

Each link 24 has first and second longitudinal side surfaces 36, 38 extending between the drive surfaces 28, 30. Side surfaces 36, 38 are formed with longitudinal recess surfaces 40, 42.

Figure 6:
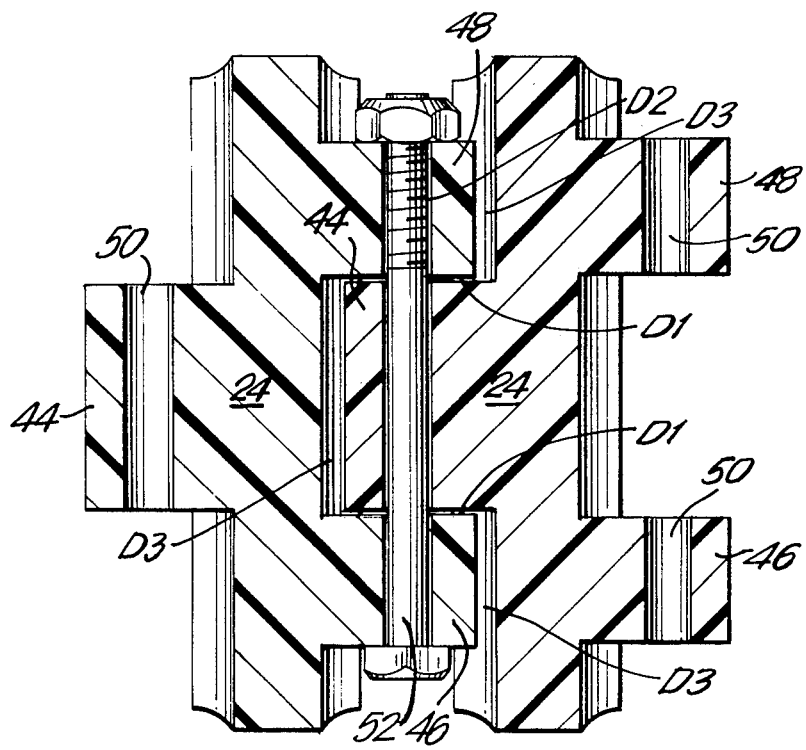
FIG. 6 is a cross-sectional view along the plane 6—6 of FIG. 5.
Figure 7:
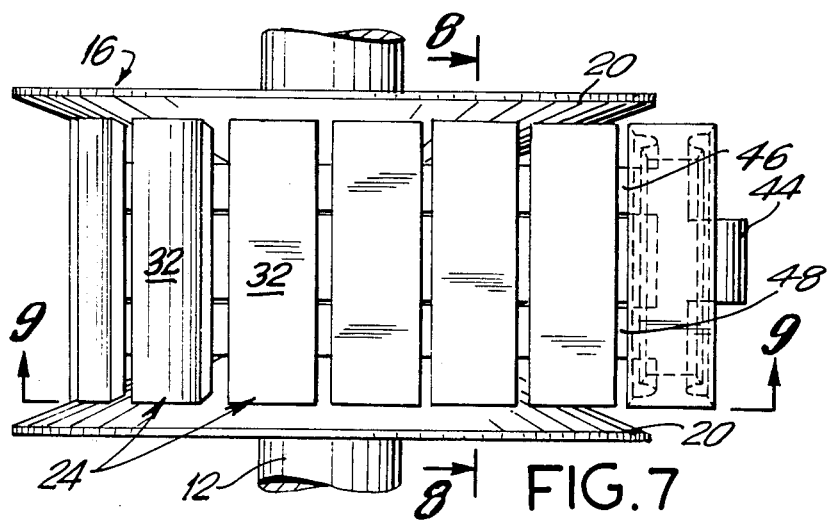
FIG. 7 is a plan view of the drive belt 10 and the driving shaft 12 showing the belt links 24 engaging the drive flanges 20 that constitute the driving pulley.
Figure 8:
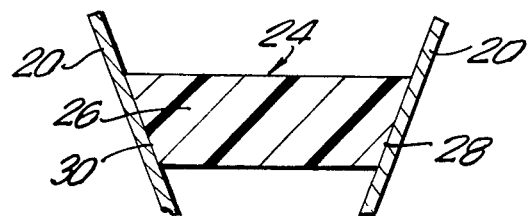
FIG. 8 is a cross-sectional view along the plane 8—8 of FIG. 7.
Figure 9:
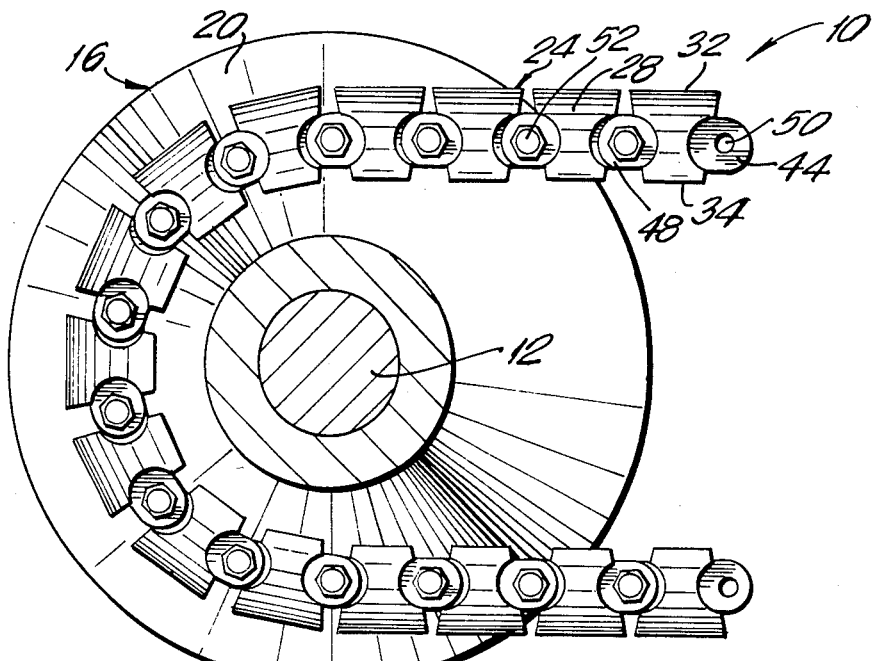
FIG. 9 is a sectional view along the surface 9—9 of FIG. 7 illustrating the relative radial positions of the drive shaft 12, the inner surface of a flange 20 and the links 24 of the drive belt 10.

In longitudinal recess surface 40, there is a single hinge member 44. In longitudinal recess surface 42, there are two longitudinally spaced apart hinge members 46 and 48. Hinge member 44 of one link fits between hinge members 46 and 48 of an adjacent link. The space between longitudinally spaced apart hinge members 46 and 48 is sufficiently greater than the length of hinge member 44 to provide a first predetermined gap D1 (see FIG. 6). Each link 24 with its hinges 44, 46 and 48 is an integrally molded unit.

Figure 5:
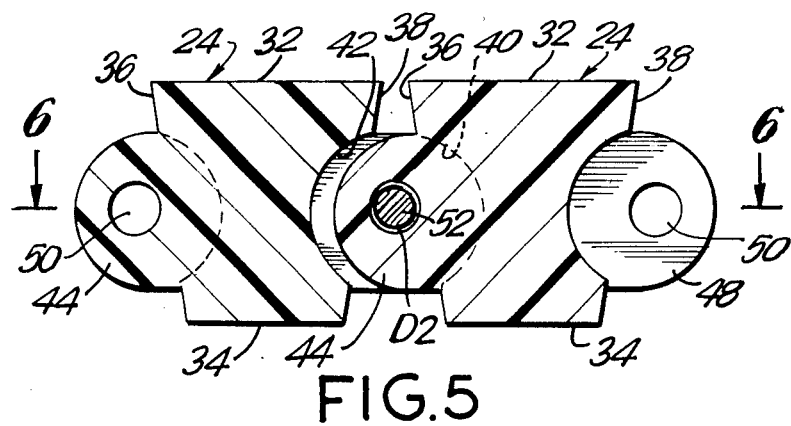
FIG. 5 is a cross-sectional view along the plane 5—5 of FIG. 2.

Each hinge member has a longitudinal bore 50. A pin 52 extends through the longitudinal bores 50 of hinges of adjacent links to provide axial alignment of the hinges 44, 46, 48 of adjacent links. The diameter of the bores 50 is greater than the diameter of the pin 52 to provide a second predetermined gap D2 (see FIGS. 5 and 6).

The axes of the bores 50 are equidistant from the recess surfaces 40, 42 of adjacent links. The curved outer surface of the hinge members 44, 46, 48 are spaced from the curved recess surfaces 40, 42 of adjacent links to provide a third predetermined gap D3 (see FIG. 6).

When the belt 10 is driven along a X-axis the pins 52 in the bore 50 permit rotation of adjacent links relative to one another about a Y-axis. Additionally, the first, second and third predetermined gaps permit rotation of adjacent links relative to one another about a Z-axis.

The links 20 are made of a molded plastic material to which oil and grease does not adhere. A presently preferred plastic material from which the links 20 may be molded is a nylon material sold under the trade name "Nypel", a product of "Allied Engineered Plastics" in Morristown, N.J. This molded plastic is hard and smooth and resists wear. The hinges 44, 46, 48 are molded integrally with the rest of the link to assure maximum strength at each link.

In one embodiment that has been tested the predetermined gaps D1 and D2 were each approximately 0.3 mm (12 mils). The gap D3 was approximately 2.8 mm (110 mils). This was an embodiment having 37 links where the axes of the shafts 12 and 14 were 31.75 cm (12.5 inches) apart. In that embodiment the gap D3 could have been substantially less than 2.8 mm.

The 3 mm gap D1 is the total gap. That is, the distance between hinges 46 and 48 is 3 mm greater than the axial distance along hinge 44. Similarly the 3 mm gap D2 is the total gap. That is, the diameter of the bore 50 is 3 mm greater than the diameter of the pin 52. The gap D3 is greater than required and it is believed that it could well be about half of the 2.8 mm in the total embodiment. It is desirable to keep the gaps D2 and D3 small in order to keep the hinge strength as great as possible.

In that embodiment, for each link the outer surface 32 was 9.6 cm×3 cm, the inner surface was 7.6 cm×1.9 cm. The drive surfaces 28, 30 were 3.2 cm high and the outer and inner surfaces 32, 34 were about 2.9 cm apart. The angle of the flanges 20, 22 and of the end drive surfaces 28, 30 to the X-Z plane was between 15° and 20°.

In that embodiment, each hinge had an outside diameter of about 18 mm. The axis of the bore 50 was offset by about 2 to 3 mm to assure that the gap D3 was about 2.8 mm.

In that embodiment, the belt can accommodate up to about 11 mm (430 mils) misalignment of the flange pairs. That is, a line at the center of the flange pair 20 parallel to the X-axis can be displaced by about 11 mm. Belt 10 adjusts to flange misalignment with little risk of breakage and with minimal wear on the belt and pulleys.

Essentially, the various gaps D1, D2 and D3 permit sufficient rotation of each link 24 about the Z-axis relative to adjacent links 24 so as to provide adjustment for this flange misalignment. The direction of force transmission is along the X-axis and thus in use there is no freedom of motion along the X-axis. Successive links 24 rotate relative to one another about the Y-axis in order to curve around the shafts 12 and 14. There is substantial freedom of rotational motion about the Y-axis for the purpose of providing the ability to couple around the shafts 12 and 14. Because of the trapezoidal shape of each link 24 the link inner surfaces 34 are spaced from one another so that a substantial amount of rotation about the Y-axis is available to accommodate to a fairly tight radius of curvature around the shafts 12 and 14. This permits a substantial variation in the drive ratio, as a function of the placement of flanges 20 and 22.

Because of the various gaps D1, D2 and D3 there is a limited degree of freedom of motion along the Y-axis and a limited degree of freedom of rotational motion about the Z-axis. This provides sufficient incremental adjustment from link to link to permit the belt 10 to accommodate the reasonably expected amount of pulley 16, 18 displacement that occurs during the operation of most equipment. This accommodation occurs without creating damage to the flanges 20, 22 or excessive wear or damage to the links 24 because the degree of accommodation permits the drive surfaces 28, 30 of each link to engage flush with the drive surfaces of the flanges 20 and 22.

What is claimed is:

1. A drive belt comprising:
  a plurality of interconnected links, each of said links having a main portion, first and second drive surfaces on opposite ends of said main portion, first and second longitudinal side surfaces extending between said drive surfaces, each of said side surfaces having a longitudinal recess surface,
  at least one hinge member on each of said recess surfaces, each of said hinge members having a longitudinal bore,
  the hinge member of each link extending into the recess of an adjacent link, a pin extending through said bores of said hinges of adjacent links to provide axial alignment of hinge members of adjacent links, said axis of said bores being equidistant between said recesses of said adjacent links, said hinge members of adjacent links being longitudinally spaced from one another to provide a first predetermined gap.

2. The belt of claim 1 wherein said hinge members are spaced from said recess surfaces of adjacent links to provide a third predetermined gap.

3. The belt of claim 1 wherein the diameter of said bores is greater than the diameter of said pin to provide a second predetermined gap.

4. The belt of claim 3 wherein said first and second predetermined gaps are at least 0.3 mm each.

5. The belt of claim 3 wherein said hinge members are spaced from said recess surfaces of adjacent links to provide a third predetermined gap.

6. The belt of claim 5 wherein said first and second predetermined gaps are at least 0.3 mm each.

7. The belt of claim 6 wherein said third predetermined gap is at least 45 mm.

8. The belt of claims 1, 2, 3 or 5 wherein said link is a molded plastic link in which said hinges are an integrally molded part of said link.

9. The belt of claims 1, 2, 3 or 5 wherein the interconnected links are formed of a molded plastic material to which oil and grease do not adhere.

10. The belt of claim 9 wherein said plastic material is nylon.

11. The belt of claim 1 wherein one of said recess surfaces has a single hinge member centered thereon and the other of said recess surfaces has two longitudinally spaced apart hinge members thereon, the spacing between said two longitudinally spaced apart hinge members being a predetermined amount greater than the length of said single hinge member such that when a single hinge member of one interconnected link is positioned between the two spaced apart hinge members of an adjacent link, said first predetermined gap is provided.

12. The belt of claim 11 wherein each link has a top surface and a bottom surface, the top surface having a length and width greater than the length and width of the bottom surface whereby the drive surface which extends between said top surface and said bottom surface is wider adjacent said top surface than it is adjacent said bottom surface.

13. The belt of claim 12 wherein one of said recess surfaces has a single hinge member centered thereon and the other of said recess surfaces has two longitudinally spaced apart hinge members thereon, the spacing between said two longitudinally spaced apart hinge members being a predetermined amount greater than the length of said single hinge member such that when a single hinge member of one interconnected link is positioned between the two spaced apart hinge members of an adjacent link, said first predetermined gap is provided.

14. The belt of claim 13 wherein each link has a top surface and a bottom surface, the top surface having a length and width greater than the length and width of the bottom surface whereby the drive surface which extends between said top surface and said bottom surface is wider adjacent said top surface than it is adjacent said bottom surface.

15. The belt of claim 13 wherein said first and second predetermined gaps are at least 0.3 mm and said third predetermined gap is substantially greater than said first and second gaps.

16. The belt of claim 17 wherein the interconnected links are formed of a molded plastic material to which oil and grease do not adhere and wherein said hinge members are molded as an integral part of a link.

17. The belt of claim 18 wherein said plastic material is nylon.

18. The belt of claim 17 wherein each link has a top surface and a bottom surface, the top surface having a length and width greater than the length and width of the bottom surface whereby the drive surface which extends between said top surface and said bottom surface is wider adjacent said top surface than it is adjacent said bottom surface.

19. The belt of claim 1 wherein said first predetermined gap is at least 0.3 mm.

20. The belt of claim 1 wherein each link has a top surface and a bottom surface, the top surface having a length and width greater than the length and width of the bottom surface whereby the drive surface which extends between said top surface and said bottom surface is wider adjacent said top surface than it is adjacent said bottom surface.

21. A drive belt comprising:

a plurality of interconnected links, each of said links having a main portion, first and second drive surfaces on opposite ends of said main portion, first and second longitudinal side surfaces extending between said drive surfaces, each of said side surfaces having a longitudinal recess surface, at least one hinge member on each of said recess surfaces, each of said hinge members having a longitudinal bore, the hinge member of adjacent links being longitudinally spaced from one another to provide a first predetermined gap, a pin extending through said bores of said hinges of adjacent links to provide axial alignment of hinge members of adjacent links, the diameter of said bores being greater than the diameter of said pin to provide a second predetermined gap, said axis of said bores being equidistant between said recesses of said adjacent links, said hinge members being spaced from said recess surfaces of adjacent links to provide a third predetermined gap, when said belt is driven along an X-axis, said pins in said bores permitting rotation of adjacent links relative to one another about a Y-axis, said first, second and third predetermined gaps permitting limited rotation of adjacent links relative to one another about a Z-axis.

22. A drive belt comprising:

a plurality of interconnected links, each of said links having a main portion, first and second drive surfaces on opposite ends of said main portion, first and second longitudinal side surfaces extending between said drive surfaces, each of said side surfaces having a longitudinal recess surface, at least one hinge member on each of said recess surfaces, each of said hinge members having a longitudinal bore, the hinge member of each link extending into the recess of an adjacent link, a pin extending through said bores of said hinges of adjacent links to provide axial alignment of hinge members of adjacent links, said axis of said bores being equidistant between said recesses of said adjacent links, when said belt is driven along an X-axis, said pins in said bores permitting rotation of adjacent links relative to one another about a Y-axis, said pin, bore, hinges and recesses providing predetermined gaps therebetween to permit limited rotation of adjacent links relative to one another about a Z-axis.

* * * * *